(12) United States Patent
Nakajima

(10) Patent No.: US 11,348,587 B2
(45) Date of Patent: May 31, 2022

(54) REVIEW SYSTEM FOR ONLINE COMMUNICATION, METHOD, AND COMPUTER PROGRAM

(71) Applicant: BELLFACE INC., Tokyo (JP)

(72) Inventor: Kazuaki Nakajima, Tokyo (JP)

(73) Assignee: BELLFACE, INC., Tokyo (JP)

( * ) Notice: Subject to any disclaimer, the term of this patent is extended or adjusted under 35 U.S.C. 154(b) by 221 days.

(21) Appl. No.: 16/542,421

(22) Filed: Aug. 16, 2019

(65) Prior Publication Data

US 2020/0126564 A1 Apr. 23, 2020

(30) Foreign Application Priority Data

Oct. 18, 2018 (JP) .............................. JP2018-196621

(51) Int. Cl.
*G10L 15/00* (2013.01)
*G10L 17/00* (2013.01)
*G06F 3/14* (2006.01)
*H04L 51/08* (2022.01)

(52) U.S. Cl.
CPC ................ *G10L 17/00* (2013.01); *G06F 3/14* (2013.01); *H04L 51/08* (2013.01)

(58) Field of Classification Search
CPC .... G06F 3/0481; G06F 3/014; G06F 3/04847; G06F 3/0482; G06F 3/0488; G10L 17/00; H04L 51/08
See application file for complete search history.

(56) References Cited

U.S. PATENT DOCUMENTS

| | | | |
|---|---|---|---|
| 7,006,881 B1 * | 2/2006 | Hoffberg | G06V 40/103 709/200 |
| 7,362,349 B2 * | 4/2008 | Nelson | H04N 7/152 348/14.09 |
| 7,814,155 B2 * | 10/2010 | Buchheit | H04L 51/16 709/206 |
| 9,986,009 B2 * | 5/2018 | Thang | H04L 65/60 |
| 10,410,604 B2 * | 9/2019 | Greco | G06F 3/0482 |
| 10,541,824 B2 * | 1/2020 | Bader-Natal | H04L 12/1818 |
| 10,664,468 B2 | 5/2020 | Nakajima et al. | |
| 10,757,148 B2 * | 8/2020 | Nelson | H04L 65/4015 |
| 10,798,145 B1 * | 10/2020 | Garney | H04N 21/2407 |
| 11,082,661 B1 * | 8/2021 | Pollefeys | H04N 7/15 |
| 2007/0283381 A1 * | 12/2007 | Sidi | H04N 21/812 348/E7.071 |

(Continued)

FOREIGN PATENT DOCUMENTS

| | | | | |
|---|---|---|---|---|
| CA | 2887596 C | * | 6/2016 | ......... G06Q 30/0241 |
| JP | 2006208482 A | | 8/2006 | |

(Continued)

*Primary Examiner* — Nicholas Augustine
(74) *Attorney, Agent, or Firm* — WCF IP

(57) ABSTRACT

Review of online communications that is performed with sharing web pages is enabled by a system that stores the shared web pages and the titles which are used during an online communication. A reference history recording portion stores the order in which the shared web pages were shared and a reference time during the online communication. Titles of the shared web pages are displayed for the online communication along a time series on a display terminal. In addition, each reference time for the shared web pages is displayed.

14 Claims, 13 Drawing Sheets

(56) References Cited

U.S. PATENT DOCUMENTS

| | | | | |
|---|---|---|---|---|
| 2010/0251177 | A1* | 9/2010 | Geppert | H04L 51/046 709/206 |
| 2012/0023407 | A1* | 1/2012 | Taylor | G06F 3/04842 715/731 |
| 2012/0304230 | A1* | 11/2012 | Harwell | H04N 21/2743 725/39 |
| 2013/0198296 | A1* | 8/2013 | Roy | G06Q 10/107 709/206 |
| 2013/0216206 | A1* | 8/2013 | Dubin | H04N 7/155 386/282 |
| 2013/0246643 | A1* | 9/2013 | Lu | H04L 67/02 709/231 |
| 2015/0003595 | A1* | 1/2015 | Yaghi | H04M 3/5175 379/85 |
| 2015/0277732 | A1* | 10/2015 | Billgren | G06F 16/738 715/716 |
| 2016/0004390 | A1* | 1/2016 | Laska | G08B 13/19613 715/723 |
| 2017/0105668 | A1* | 4/2017 | el Kaliouby | A61B 5/0077 |
| 2017/0302795 | A1* | 10/2017 | Wolzien | H04N 21/2668 |
| 2018/0159909 | A1* | 6/2018 | Huang | H04N 21/242 |
| 2018/0173746 | A1 | 6/2018 | Nakajima et al. | |
| 2018/0350144 | A1* | 12/2018 | Rathod | G06T 13/40 |
| 2018/0351895 | A1* | 12/2018 | Rathod | A63F 13/655 |
| 2019/0034976 | A1* | 1/2019 | Hamedi | G06Q 30/0243 |
| 2019/0108578 | A1* | 4/2019 | Spivack | G06Q 30/0643 |
| 2019/0147838 | A1* | 5/2019 | Serletic, II | G10H 1/368 704/260 |
| 2020/0264829 | A1* | 8/2020 | Taguchi | G06F 3/04855 |

FOREIGN PATENT DOCUMENTS

| | | |
|---|---|---|
| JP | 2012049785 A | 3/2012 |
| JP | 2013222347 A | 10/2013 |
| JP | 2014204411 A | 10/2014 |
| JP | 2015060324 A | 3/2015 |
| JP | 2016/199901 A1 | 5/2016 |
| JP | 2017004503 A | 1/2017 |
| JP | 6120422 B2 | 4/2017 |
| JP | 6128668 B2 | 5/2017 |
| JP | 2018073237 A | 5/2018 |

* cited by examiner

FIG.2

| Communication ID | Customer Address | Customer usage circumstance | User ID |
|---|---|---|---|
| 1312 | 106.184.21.52 | ... | U1023 |
| ... | ... | ... | ... |

FIG.3

| User ID | Document Data | | | |
|---|---|---|---|---|
| | Original Data | Title | Web Page | Title |
| U0001 | ....pdf | ... | ... | ... |
| ... | ... | ... | ... | ... |

FIG. 4

| Communication ID | User ID | Reference History | |
|---|---|---|---|
| | | Shared web page | Reference Time |
| 1312 | U1023 | https://······ | 0:22 |
| | | https://······ | 1:51 |
| | | https://······ | 3:07 |
| ··· | ··· | ··· | ··· |

FIG. 9

| Communication ID | | Customer Address | Customer Usage Circumstance | Start date of access |
|---|---|---|---|---|
| 7267 | Connect ~111 | 106.184.21.52 | . . . | 2016/03/20 15:10:56 |

FIG. 13

| Communication ID | User ID | Reference History | | | Window Information | |
| --- | --- | --- | --- | --- | --- | --- |
| | | Reference Web Page | Reference Time | | Active/Non-active | Time |
| 1312 | U1023 | https://······ | 0:22 | | Active | 0:22 |
| | | https://······ | 1:51 | | Active | 0:53 |
| | | https://······ | 3:07 | | Non-active | 1:21 |
| | | ··· | ··· | | Active | 1:51 |
| | | | | | Active | 3:07 |
| ··· | ··· | | | | | |

REVIEW SYSTEM FOR ONLINE COMMUNICATION, METHOD, AND COMPUTER PROGRAM

TECHNICAL FIELD

The present invention relates to a technology that enables to review online communication sharing web pages among terminals.

Recently, for sales method named as inside sales, there is a broad supply of systems for sharing web pages or contents in real time and conducting business discussions or meetings on the basis of the web pages or contents. The business discussion using with such system enables another business discussion after that to be better by reviewing. Further, sharing the result of the review in the company enables to develop human resource.

PRIOR ART DOCUMENTS

Patent Documents

[Patent Document 1] Japanese Patent No. 6128668
[Patent Document 2] Japanese Patent No. 6120422
[Patent Document 3] Japanese Patent Application Publication No. 2012-049785
[Patent Document 4] Japanese Patent Application Publication No. 2014-204411
[Patent Document 5] Japanese Patent Application Publication No. 2018-073237

DISCLOSURE OF THE INVENTION

Problems the Invention is Intended to Solve

However, a system recording the business discussion sharing web pages, and reviewing them in order to make use of business after that has not been supplied.

Given this, an object of the present invention is to enable to review online communication done with shared web pages, and to confirm and discuss precisely the contents of the online communication.

Means for Solving the Aforementioned Problems

1. In order to achieve the above object, a review system for online communication system according to one aspect of the present invention is a review system for online communication sharing web pages, the system including a document data storage portion storing with association of the shared web pages and their titles during the online communication; a reference history recording portion storing an order of sharing of the web pages and reference time for each during the online communication into a reference history storage portion; a first display portion displaying the titles of the shared web pages on the online communication along time series on a terminal; and a second display portion displaying the each reference time of the referred web pages on the terminal.

The second display portion may be configured to refer the reference history storage portion and display the reference time of the shared web pages on the terminal with predetermined object size.

The first display portion and the second display portion may be configured to omit to display the title of the web page whose reference time is the predetermined length or less.

The review system may further include a voice recording portion recording voice of the online communication into a voice information storage portion as voice information; and a reproducing portion reproducing the voice generated when the web page is referred with response to the title designated among the titles of the web pages displayed by the first display portion.

The review system may further include an analyzing portion referring the voice information storage portion and analyzing the voice information; and a third display portion displaying the analyzing result acquired by analyzing the voice information on the terminal.

The analyzing portion may be configured to identify the voice of a speaker contained in the voice information, and the third displaying portion may be configured to display an icon indicating that laugh voice is occurred associating with the title of the web page referred when the laugh voice is identified among the titles of the web pages displayed along time series by the first display portion.

The analyzing portion may be configured to identify each voice of speakers contained in the voice information, and the third display portion may be configured to display a talk ratio for the each speaker contained in the voice information on the terminal.

The review system may further include a window information acquirer acquiring an information of an active window displayed on top when a plurality of windows is deployed on the terminal executing the online communication on execution of the online communication, and the voice information storage portion may be configured to further stores an information of the active window on the online communication, and wherein the first display portion may be configured to refer the reference history storage portion and display capable of discriminating whether the window displaying the shared web page on the online communication was active.

In addition, a review method for online communication system according to another aspect of the present invention is a review method for online communication sharing web pages, with a system including a document data storage portion storing with association of the shared web pages and their titles on the online communication, the method being characterized in that the computer executes: a process for storing an order of sharing of the web pages and reference time for each during the online communication into a reference history storage portion; a process for displaying the titles of the shared web pages on the online communication along time series on a terminal; and a process for displaying the each reference time of the referred web pages on the terminal.

In addition, a computer program according to still another aspect of the present invention is a computer program configured to enable to review online communication sharing web pages, for causing a computer having a document data storage portion storing with association of the shared web pages and their titles on the online communication, the program executing, on the computer: a process for storing an order of sharing of the web pages and reference time for each during the online communication into a reference history storage portion; a process for displaying the titles of the shared web pages on the online communication along time series on a terminal; and a process for displaying the each reference time of the referred web pages on the terminal.

Effect of the Invention

According to the present invention, the review system can review online communication done with shared web pages, and to confirm and discuss precisely the contents of the online communication.

BRIEF DESCRIPTION OF THE DRAWINGS

FIG. 2 is an exemplary view of data stored in a setting information storage portion of the online communication system.

FIG. 3 is an exemplary view of data stored in a document data storage portion of the online communication system.

FIG. 4 is an exemplary view of data stored in a reference history storage portion of the online communication system.

FIG. 9 is an exemplary view of screen image on a user terminal performed by the online communication system.

FIG. 13 is an exemplary view of data stored in a reference history storage portion of the online communication system.

MODE FOR CARRYING OUT THE INVENTION

Hereafter, review systems for online communication according to embodiments of the present invention are described with reference to the drawings.

The review systems for online communication according to embodiments of the present invention is systems which constitute of a part of online communication system which enable communication sharing web pages among members, and it enables to review the contents of communication by online.

Here, services provided by the online communication system consist of a online communication service which enables to provide a place of the communication sharing web pages for users and their customers of the service, and a review service which enables to review the contents of the online communication. As practical use scene assumed for these services, the users deploy documents for explanation on web pages and do business talks and product description or the like sharing the documents with the customers during the online communication. Further, the review service enables to review the contents of the online communication between the user and the customer and to make use of another business discussion or the like.

First Embodiment

Figure 1:
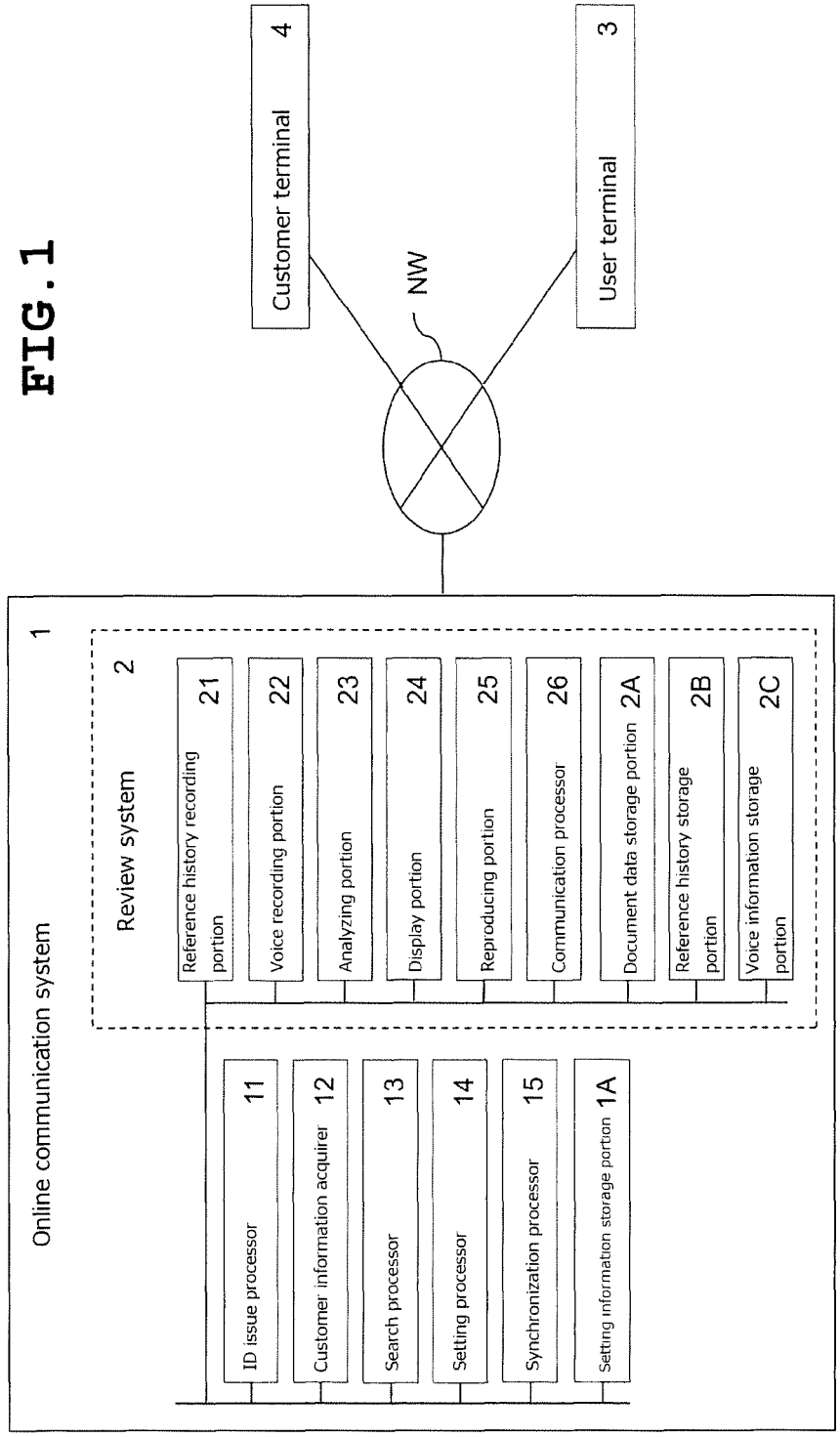
FIG. 1 is a functional block diagram indicating functions provided to an online communication system having a review system according to the first embodiment of the present invention.

Functions provided to a review system 2 for online communication according to a first embodiment of the present invention and an online communication system 1 are described in detail with reference to FIG. 1.
Online Communication System 1

The online communication system 1 is a system associating a user terminal 3 used by the user and a customer terminal 4 used by the customer of the user, enabling online communication during which web pages are shared between them, and enabling reviewing the online communication done by itself.

The online communication system 1 is provided with a computation device such as a central processing unit (CPU), a computer program executed by the CPU, internal memory such as random access memory (RAM) or read-only memory (ROM), and the like, and configures functional blocks comprising an ID issue processor 11, a customer information acquirer 12, a search processor 13, a setting processor 14, a synchronization processor 15, a setting information storage portion 1A, a reference history recording portion 21, a voice recording portion 22, an analyzing portion 23, a display portion 24, a reproducing portion 25, a communication processor 26, a document data storage portion 2A, a reference history recording portion 2B, and a voice information storage portion 2C.

Of these functional blocks, the reference history recording portion 21, the voice recording portion 22, the analyzing portion 23, the display portion 24, the reproducing portion 25, the communication processor 26, the document data storage portion 2A, the reference history recording portion 2B, and the voice information storage portion 2C constitute a review system 2 according to the embodiment of the present invention.

Further, the online communication system 1 is configured to be capable of communicating with the user terminal 3 and the customer terminal 4 via a network NW, such as the Internet.

The ID issue processor 11 is a processor that issues a specific communication ID for each communication in order to associate a user and a customer who perform the online communication. This communication ID is issued for identification of communication between the user and the customer, and is given a notice to the user via the user terminal 3.

The customer information acquirer 12 executes a process for acquiring a customer address as a customer identification information capable of being identified the customer terminal 4 when the customer information acquirer 12 receives an issuance request of a specific communication ID for each communication. Here, the customer address is an information capable of being identified the customer terminal 4 on the network NW, that is, for example, an IP address.

Further, the customer information acquirer 12 enables of acquiring an information regarding the operating system (OS) of the customer terminal 4 and an information whether the customer terminal 4 has a device such as a web camera or the like, as the information regarding the usage circumstance.

The search processor 13, when it receives a search request of a predetermined communication ID, executes a process for searching the customer terminal 4 identified by its customer address associated with the predetermined communication ID with reference to the setting information storage portion 1A.

The search result is supplied to the user terminal 3. The user requests the online communication system 1 to start the communication with the customer terminal 4 shown in the search result.

The setting processor 14, when the communication ID is issued by the ID issue processor 11, sets an association between the issued communication ID and the customer terminal 4 requesting the issue of the communication ID with reference to the setting information storage portion 1A.

Further, the setting processor 14, when it receives the start request of the communication with the customer terminal 4 identified by the customer address associated with the predetermined communication ID from the user terminal 3, sets an association between the user terminal 3 and the customer terminal 4 identified by the customer address associated with the predetermined communication ID with reference to the setting information storage portion 1A.

The synchronization processor 15 establishes a session between the user terminal 3 and the customer terminal 4 which are associated each other by the setting processor 14. The synchronization processor 15 executes a synchronization process of screens deploying on the terminals 3, 4.

The synchronization process establishes the session between the user terminal 3 and the customer terminal 4 associated each other and the online communication system 1. In addition, the synchronization process, by performing regular polling and analyzing JavaScript (registered trademark) installed in the browsers of the user terminal 3 and customer terminal 4, collects a reference history of web pages by each terminal and operation information including such as mouse coordinates or scroll positions, or the like, in response to the operations of the terminals by users and customers. Further, the synchronization process synchronizes, when some actions or changes are detected on one of the terminals, by reproducing in the other terminal the detected actions or changes.

The synchronization process enables to share the web pages between the user terminal 3 and the customer terminal 4 so that the terminal operations on the web pages by the user or the customer are reflected on the screen of each terminal. As a result, they can communicate referring always the same web pages and grasping the other member's (the user's or the customer's) terminal operations.

The setting information storage portion 1A is a storage portion storing information capable of grasping the user and the customer who perform the communication, every communication by the user and the customer.

With reference to FIG. 2, the setting information storage portion 1A stores the customer address and the user ID associated with the unique communication ID for each communication, for example.

In the setting information storage portion 1A, when the communication ID is issued by the ID issue processor 11, the communication ID and the customer terminal 4 requesting the issue of the communication ID are stored with association each other. When it receives the request to start the communication by the user terminal 3, the user ID of the user terminal 3 is associated with the communication ID.

Further, in the embodiment, information regarding an usage circumstance of the customer terminal 4 is stored with the customer address acquired by the customer information acquirer 12.

The series of processing described above regarding association with the user terminal 3 and the customer terminal 4 in order to perform online communication between them is just an example. Therefore, the system may realize that by other processing.

Review System 2

The review system 2 is a part of the online communication system 1 realizing online communication, and a system capable of reviewing the online communication which is performed by the user and the customer and which is referring the shared web pages.

As described above, the review system 2 consists of the reference history recording portion 21, the voice recording portion 22, the analyzing portion 23, the display portion 24, the reproducing portion 25, the communication processor 26, the document data storage portion 2A, the reference history recording portion 2B, and the voice information storage portion 2C.

The reference history recording portion 21 stores an order of sharing and referred and each reference time of the web pages into the reference history storage portion 2B, which are shared and referred by the user and the customer during the online communication.

The voice recording portion 22 records voice when the online communication performs into a voice information storage portion 2C as a voice information. The voice recording portion 22 obtains the voice input via voice input device such as microphones provided on the user terminal 3 and the customer terminal 4.

The analyzing portion 23 refers the voice information storage portion 2C and analyzes the voice information by voice recognition technique or the like and identifies variously the voice contained in the voice information. Concretely, it identifies the speaker, laugh voice and volume or the like. By the analysis, the system 2 can grasp a talk ratio for each speaker, parts of the laugh voice occurred in the voice information, parts of the voice of volume exceeding predetermined value, and mood of communication judged from the entire voice.

The display portion 24 generates the review picture along the predetermined format and deploys it on the user terminal 3.

An exemplary view of the screen image deployed by the display portion 24 on the user terminal 3 is described later.

The reproducing portion 25 reproduces the voice information stored in the voice information storage portion 2C during the review of the online communication. The user can listen to the voice reproduced by the voice output device such as a speaker provided on the user terminal 3.

The communication processor 26 executes a process for transmission and reception of the data between the user terminal 3 and the customer terminal 4 via the network NW such as the Internet.

By the communication processor 26, the system 2 enables of synchronization between the user terminal 3 and the customer terminal 4 by establishing a session therebetween, and of providing with the review information for the user terminal 3.

The document data storage portion 2A is a storage portion storing the web pages shared during the online communication and the original document data of the web pages.

As shown in FIG. 3, in the document data storage portion 2A, the document data referred during the online communication, associated with the user ID capable to be identified the user registering the document data, are stored, for example.

The document data includes the original data registered by the user, the titles of the original data, the web pages generated by converting the original data per page, and the title given every web page.

The original data is in the form of PDF or PowerPoint or the like and is given a title by the user. The web page generated by converting this original data per page is given the title automatically based on the content of each page.

The original data is converted into the web pages, each page of which is assigned a unique URL. The converting process may execute on registration of the original data or on performing the online communication.

Further, the title of each web page can consist of the text of the top of each page, for example. The title may also be generated by analyzing the content of each page. The titles may be changed arbitrarily by the user after registration of the web pages.

Furthermore, in the document data storage portion 2A, certification information for certifying a user or other detailed information such as names or user's contact information, as information of the user as a person who registers the document data, may also be stored in the document data storage portion 2A.

The reference history storage portion 2B is a storage portion storing an order of sharing of the web page and refering during the online communication and reference time for each web page.

As shown in FIG. 4, in the reference history storage portion 2B, for example, the communication ID capable of being recognized the online communication and the information regarding the reference history associated with the user ID of the user who performs the online communication are stored. The information regarding the reference history includes the shared web pages in order of reference and the reference time for each web page.

The voice information storage portion 2C is a storage portion storing the voice information during the online communication.

The voice information can be stored in various form of data, is recorded by the voice recording portion 22, and is reproduced by the reproducing portion 25.

The user terminal 3 is a terminal used by the user of services provided by the online communication system 1. The user terminal 3 is for that the user performs communication with his/her customer and for that he/she reviews the communication.

The user terminal 3 includes a so-called personal computer or tablet terminal, a portable smart device, or the like, and includes functional parts such as an input/output processor (reduced to practice by a display, speaker, keyboard, touchscreen, pointing device, headset, or the like) and a communication processor such as a browser program for performing data transmission and reception.

The customer terminal 4 is a terminal used by the user's customer. Similar to the user terminal 3, the customer terminal 4 is also configured by a so-called personal computer or tablet terminal, a portable smart device, or the like, and includes functional parts such as an input/output processor (reduced to practice by a display, speaker, keyboard, touchscreen, pointing device, or the like) and a communication processor such as a browser for performing data transmission and reception.

In the embodiment, at executing of the online communication by the online communication system 1, browser programs to refer web pages are sufficient to be installed for the user terminal 3 and the customer terminal 4. Therefore, the terminals 3, 4 do not need to be installed specific software nor application programs for sharing web pages.

With reference to FIGS. 5 to 9, an example of processing before performing the online communication among a procedural flow executed by the online communication system 1 is described.

Figure 5:
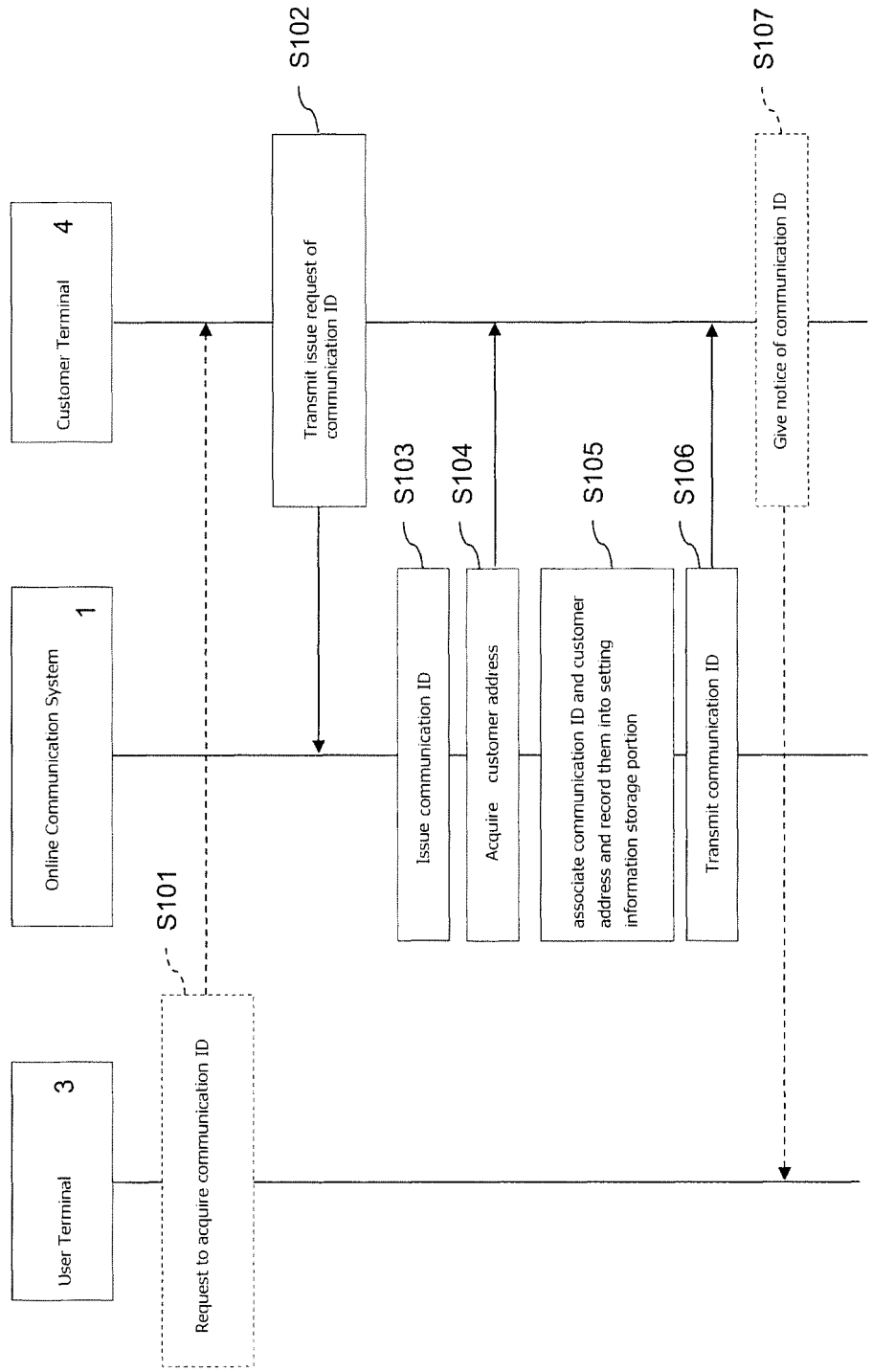
FIG. 5 is a sequence diagram illustrating a procedural flow executed by the online communication system.

As shown in FIG. 5, the user communicating with the customer by telephone requests the customer to acquire a communication ID to conduct business discussions or give product descriptions using the system 1, by the telephone (S101).

In the acquiring request of the communication ID, the system 1 directs the customer to a predetermined web page and requests an execution of operation on the web page.

Figure 6:
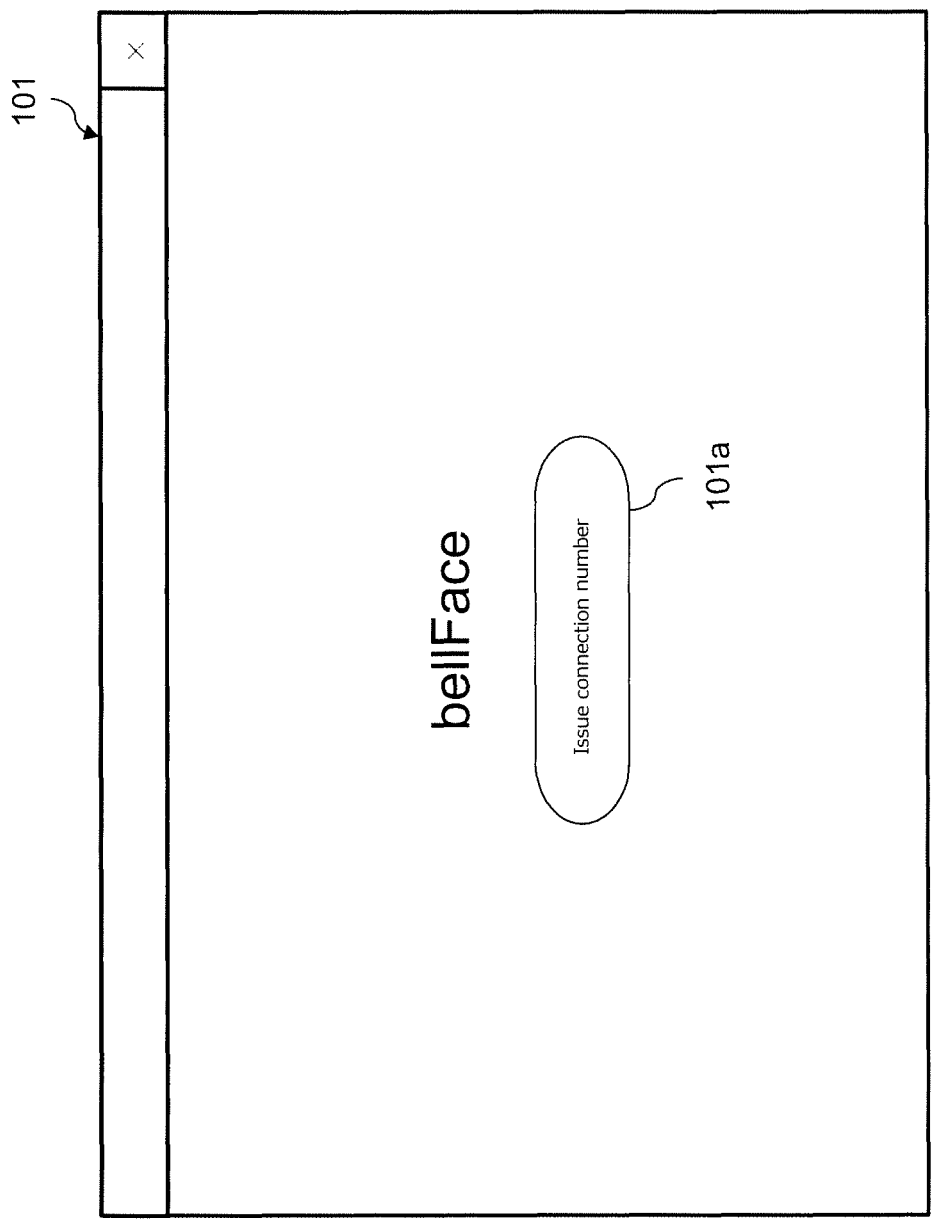
FIG. 6 is an exemplary view of screen image on a customer terminal performed by the online communication system.

Here, an example of the web page displayed on the customer terminal 4 is shown in FIG. 6.

On the web page 101, only an "Issue connection number" button 101a is displayed for request of the online communication system 1 to acquire the communication ID.

When the customer clicks the "Issue connection number" button 101a on the web page 101, the acquiring request is transmitted from the customer terminal 4 to the online communication system 1 (S102).

The online communication system 1 receiving the acquiring request of the communication ID from the customer terminal 4 issues the communication ID capable of being identified online communication by the ID issue processor 11 (S103).

The ID issue processor 11 issues the unique (not duplicate) ID with reference to the setting information storage portion 1A so that a new issued communication ID enables not to duplicate other communication ID issuing now. In the embodiment, the communication ID consists of 4 digits, and is easy to be memorized for the customer and easy to be told the user by the customer without mistake.

The online communication system 1 acquires the customer address of the customer terminal 4 via the customer information acquirer 12 at the timing of receiving the issuance request of the communication ID from the customer terminal 4 (S104).

The communication ID issued by the ID issue processer 11 and the customer address acquired by the customer information acquirer 12 are associated with each other by the setting processor 14 and are stored into the setting information storage portion 1A, (S105).

In response to the issuance of the communication ID, the communication ID are given notice to the customer terminal 4 (S106).

Figure 7:
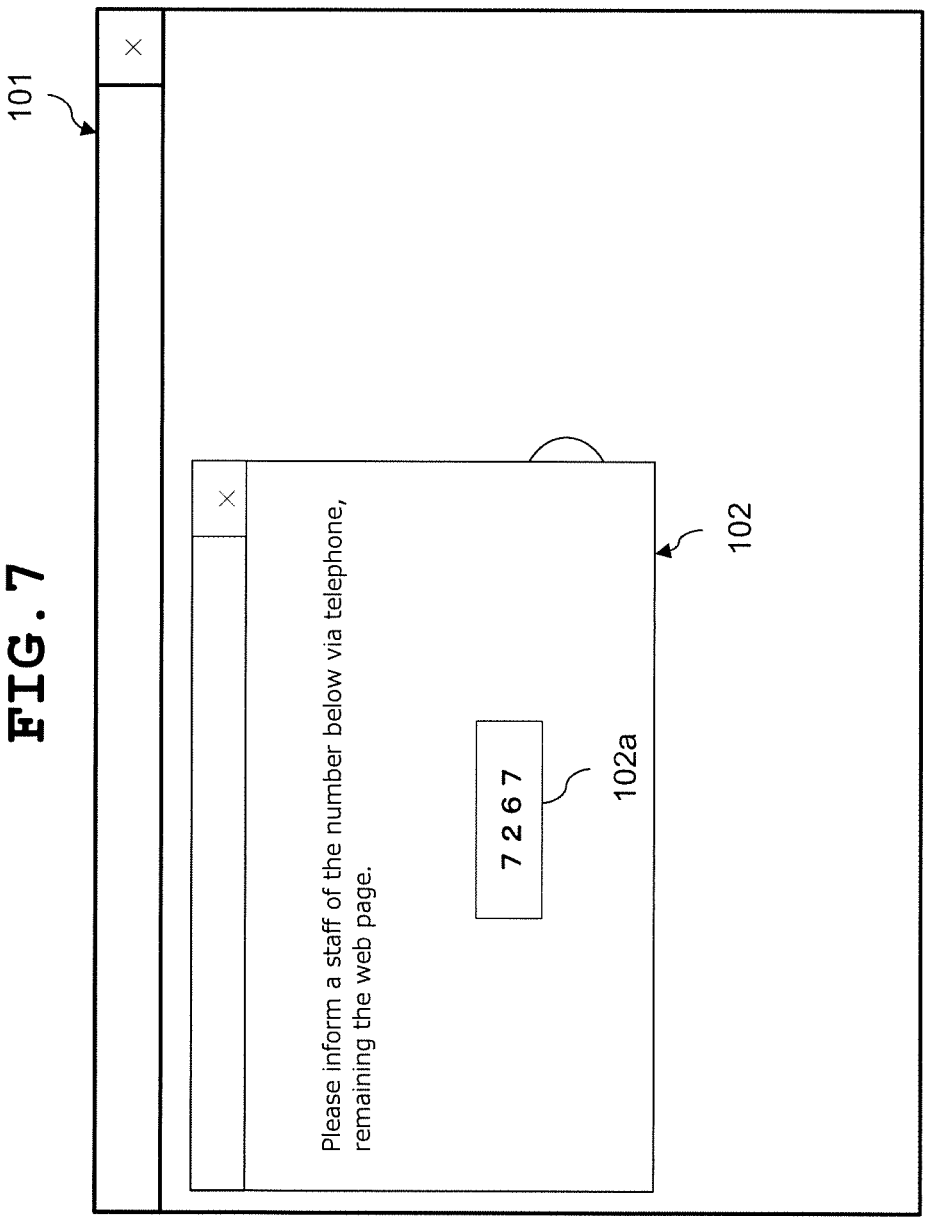
FIG. 7 is an exemplary view of screen image on a customer terminal performed by the online communication system.

FIG. 7 shows an exemplary view of screen image on the customer terminal 4 when the communication ID are given notice from the online communication system 1.

As shown in FIG. 7, in response to the click (mainly by the customer) of the "Issue connection number" button 101a to request the issuance of the communication ID, a new pop-up window 102 deploys. In the pop-up window, a communication ID display field 102 is provided, displaying the communication ID issued in response to the issuance request from the customer.

The customer received the communication ID from the online communication system 1 gives notice the communication ID to the user orally by telephone (S107).

Figure 8:
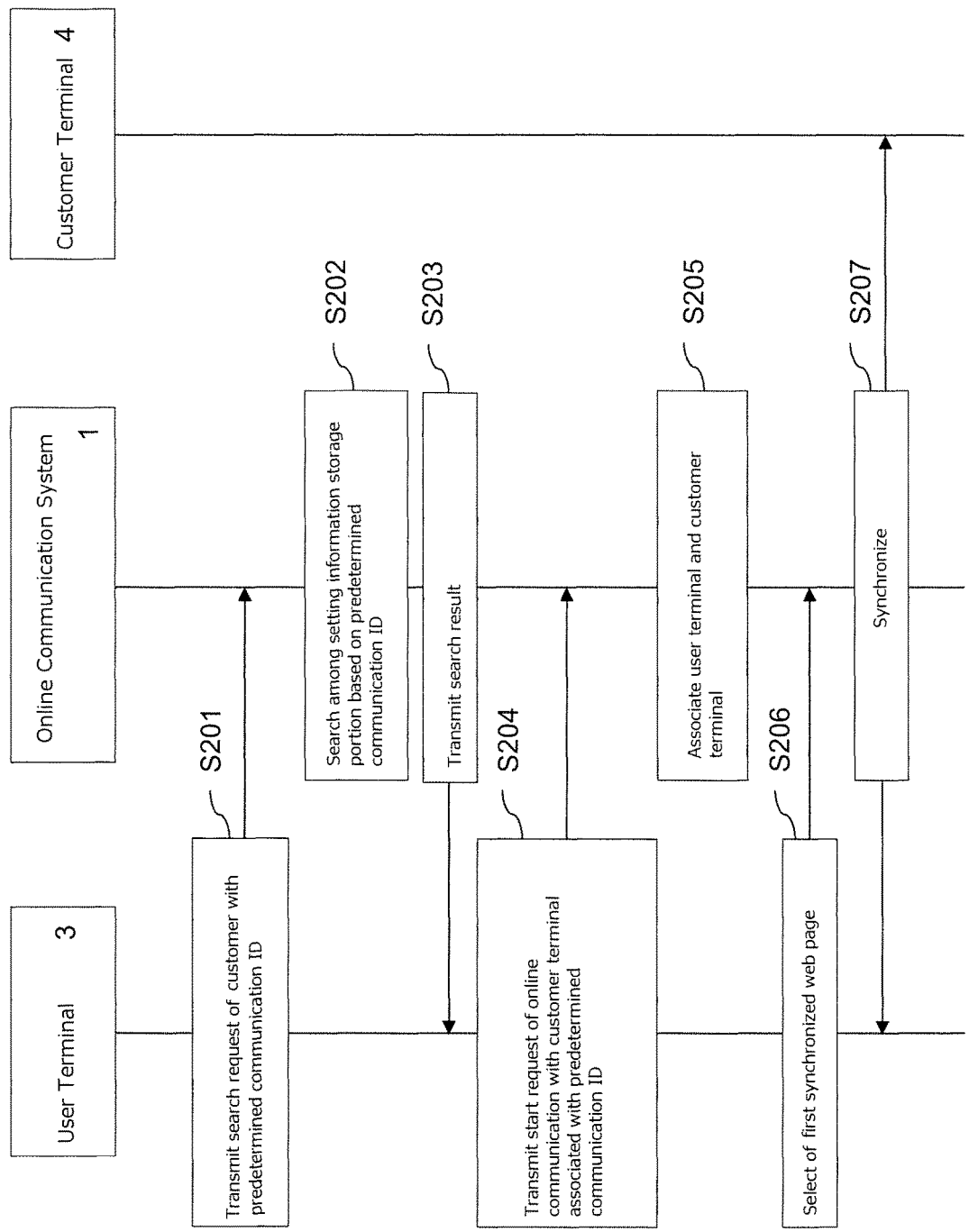
FIG. 8 is a sequence diagram illustrating a procedural flow executed by the online communication system.

Processings after the notice of the communication ID from the customer to the user are described with reference to FIG. 8.

The user informed of the communication ID orally from the customer requests a processing below to the online communication system 1 via the website prepared for the user of the service.

The user transmits the search request of the customer based on the communication ID informed by the customer to the online communication system 1 via the user terminal 3 (S201).

In response to that, the online communication system 1 executes the search in the setting information storage portion 1A based on the communication ID by the search processor 13 (S202).

As a result of the search, the information of the customer terminal 4 associated with the communication ID designated by the user, then, the information is transmitted to the user terminal 3, as the search result (S203).

FIG. 9 shows an exemplary view of screen image displaying the search result on the user terminal 3.

As the search result, not only the customer address associated with the communication ID but also the information of the customer's usage circumstance and the start date of access are displayed with the communication ID designated by the user.

The customer usage circumstance is an information of the operating system (OS) of the customer terminal 4 and whether the customer terminal 4 has a device such as a web camera. The start date of access is an information of the date (including time) when the customer accesses the online communication system 1 for request of the issue of the communication ID.

The information above is acquired when the online communication system 1 receives an access from the customer 4, and stored with the customer address in the setting information storage portion 1A.

Further, a "Connect" button 111 is displayed for request of the start of the communication with the customer terminal 4 by the service, the communication associated with the communication ID as the search result.

When the user clicks the "Connect" button 111, the start requests of the communication with the customer terminal 4 associated with the communication ID is transmitted to the online communication system 1 from the user terminal 3, designating the communication ID displayed as the search result (S204).

With response to the start request, the online communication system 1 sets an association between the user terminal 3 which requests to start the communication and the customer terminal 4 identified by the customer address associated with the communication ID designated by the user, by the setting processor 14, referring the setting information storage portion 1A (S205).

At the time of the association of the user terminal 3 and the customer terminal 4, the user selects the first web page he/she shares with the customer (S206).

In the embodiment, the selected web page is, for example, the web page converted from the selected document data by the user among the document data formerly registered in the document data storage portion 2A by the user.

The web page deployed first may be set in advance by the user.

When the web page shared with the user and the customer first is selected, the user terminal 3 and the customer terminal 4 start to be synchronized by the synchronization processor 14 and the same web pages are deployed on the both terminals of the user terminal 3 and the customer terminal 4 (S207).

Figure 10:
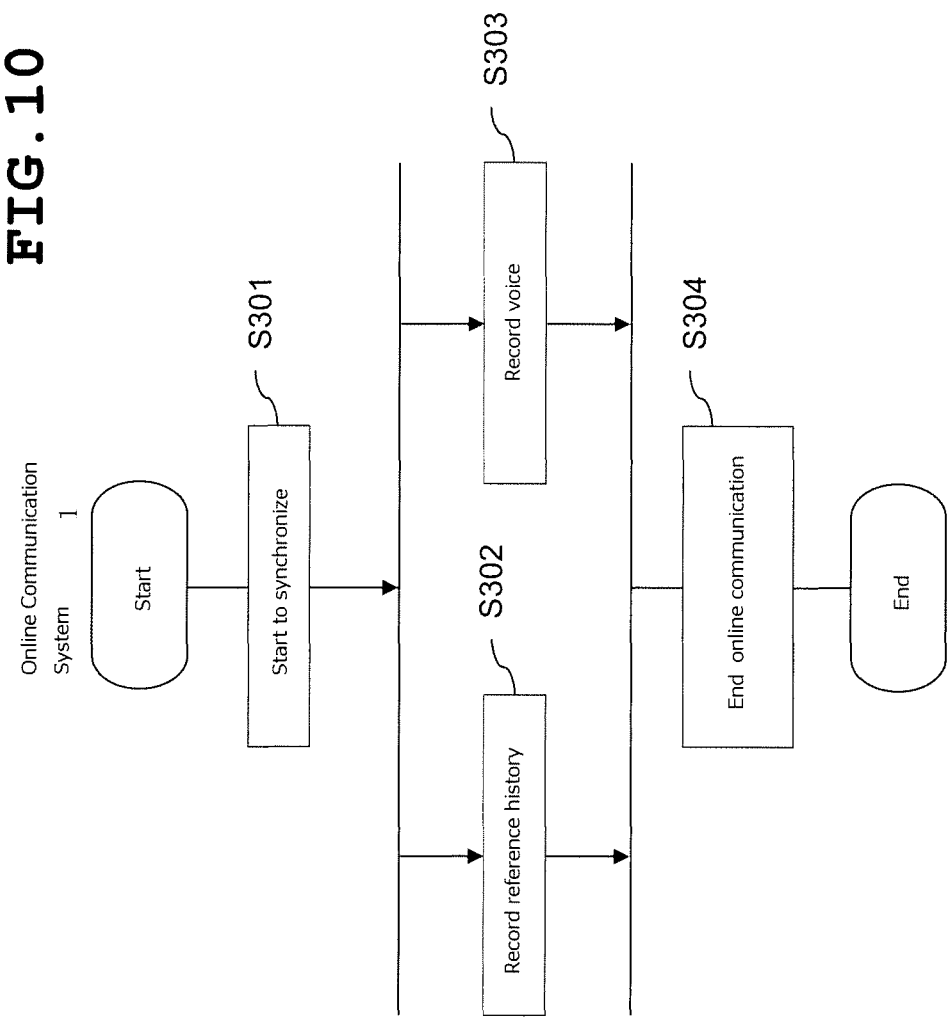
FIG. 10 is a processing flowchart illustrating a procedural flow executed by the online communication system.

After that, as shown in FIG. 10, the synchronization of the user terminal 3 and the customer terminal 4 are achieved by the synchronization processor 15 until the operation for end is executed from the user terminal 3 or the customer terminal 4 associated with each other (S301).

When the user terminal 3 and the customer terminal 4 are synchronized and the online communication starts, the referenced web pages in that order is registered in the reference history storage portion 2B by the reference history recording portion 21 (S302). And the information regarding a referred order of the web pages are also registered in the reference history storage portion 2B (S302).

At the time, the voice input via the user terminal 3 and the customer terminal 4 is recorded as a voice information into the voice information storage portion 2C by the voice recording portion 22 (S303).

The registration of the reference history and the recording is executed until the online communication ends (S304).

Such an online communication by the online communication system 1 enables communication sharing web pages with functions of the browser programs of the user terminal 3 and the customer terminal 4 without specific software and application programs.

Screen Image of Review Picture

Figure 11:
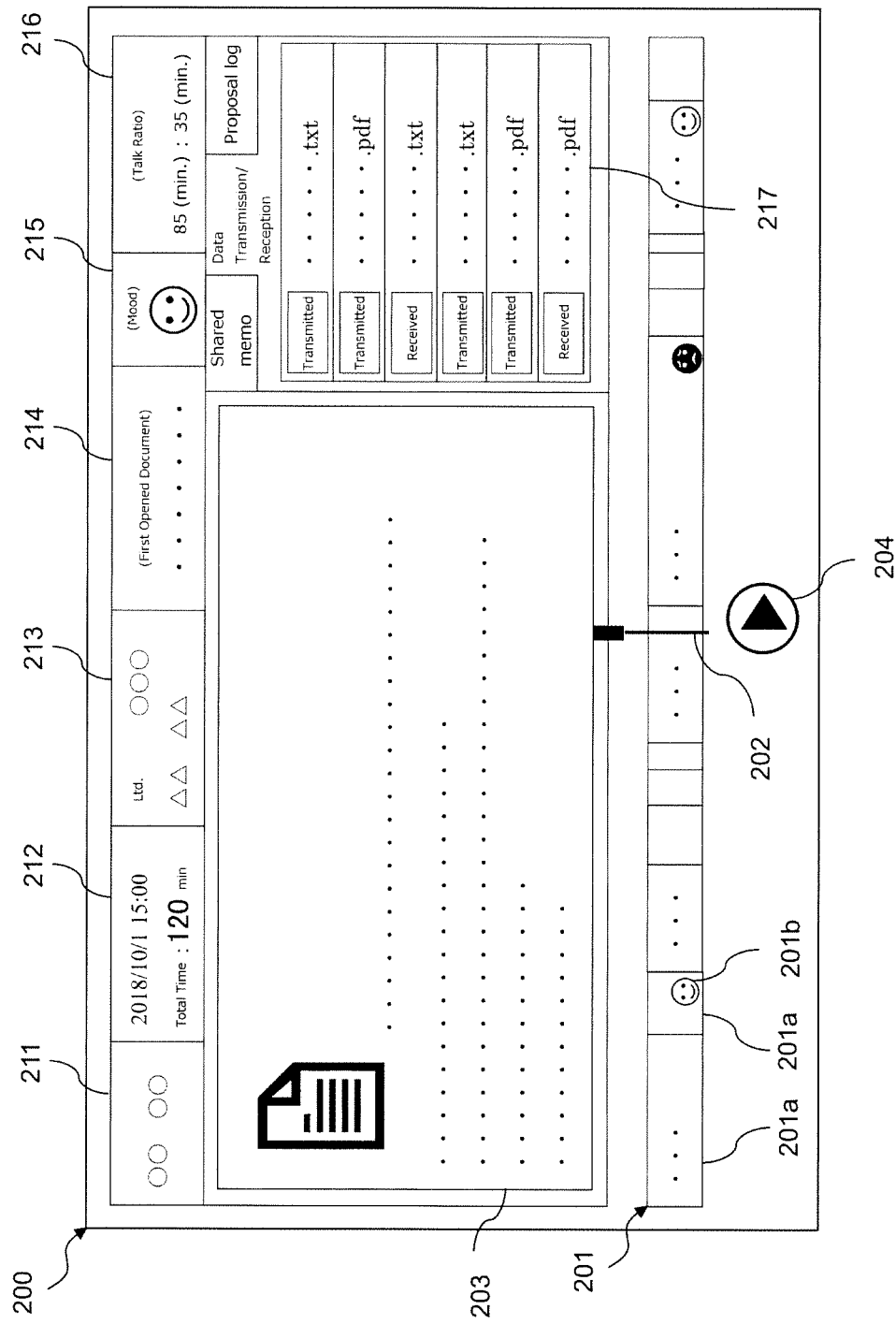
FIG. 11 is an exemplary view of screen image of a review picture on a user terminal performed by the review system.

FIG. 11 shows an exemplary view of screen image of a review picture displayed on the user terminal 3 at the scene of the review performs based on the information stored in the reference history storage portion 2B and the voice information storage portion 2C after the online communication as described above.

On the screen image of the review picture 200, the shared page display window 203 are displayed in the center, and the object display window 201 are displayed at the lower part of the display of the user terminal 3.

The shared page display window 203 is a window displaying web pages shared when the online communication was performed. In online communication, usually, a plurality of web pages is shared, and the shared page display window 203 displays one of the web pages displayed at a predetermined time among the online communication.

The object display window 201 is a window indicating schematically the information regarding the reference history stored in the reference history storage portion 2B. That is, the information of each referred web page is displayed schematically by an object 201a having a predetermined shape. The object 201a enables to grasp the title of the referred web page, an order of reference, reference time and the state at the time of reference or the like.

Title of the Referred Web Page

On each object 201a, the title of the corresponding web page is displayed based on the information stored in the document data storage portion 2A. However, from the point of view of visibility, only the titles on the objects 201a indicated the web pages referred more than predetermined time are displayed. The embodiment enables easily to grasp the titles of the shared web pages. Further, it prevents the information from becoming hard to watch by display of even titles of the web pages that were recorded as the reference history, however, were merely displayed when page ejection, and were not actually referenced.

Order of Reference

The objects 201a are arranged and displayed side by side according to the reference order of the corresponding web pages. In this embodiment, the objects 201 line up in a row from the left to the right in FIG. 11.

Regarding display of the objects 201a, all the objects 201a indicating the referenced web pages may be displayed, and only the objects 201 satisfied a predetermined condition may be displayed is also acceptable, such as the objects 201 indicating the web pages whose reference time is long.

Reference Time

Each object 201a has a length or a size corresponding its reference time. It is intuitively understood that the longer (the larger) object the longer the reference time, and the shorter (the smaller) one the shorter reference time. In the embodiment, the reference time is indicated by the horizontal width of the object 201a.

The State at the Time of Reference

On each object 201a, an icon 201b indicating the mood of the voice is displayed based on the voice information when the corresponding web page was referred. The mood is analyzed based on the result of the voice recognition by the analyzing portion 23. For example, on the object 201a (second from the left), the icon 201b indicates that laugh voice was occurred if so at that time.

The method of indicating the mood may be another method such as predetermined color classification for each mood on each object 201a or the like without using the icon 201b.

On the object display window 201, a slider 202 is provided, the slider 202 can be moved at any position on the object 201a displayed on the object display window 201. The web page indicated by the object 201a on which the slider 202 is positioned is displayed on the shared page display window 203.

Voice Reproduction

On the screen image of the review picture 200, a reproduction button 204 for request of reproduction of voice information is displayed. When the user clicks the reproduction button 204, the voice is reproduced from the position indicated by the slider 202, based on the voice information stored in the voice information storage portion 2C.

The voice information not only is reproduced with response to the reproduction request by the user, but also may be converted to text and displayed on the review picture 200. Further, the voice not related to the flow of the story, such as coughing, noise or the like, may be deleted by the voice recognition technique.

Besides, on the screen image of the review picture 200, a user name display window 211 showing the user's name, a time information display window 212 indicating the date and the total time of the online communication, a customer name display window 213 indicating the customer name (which may be a company's name as well as an individual's name), a document name display window 214 indicating the title of the document opened first, a mood display window 215 indicating the mood of the entire mood of the online communication by an icon, a talk ratio display window 216 indicating the talk ratio of the user and the customer during the online communication, and a transmission/reception data display window 217 indicating the information of the data transmitted and received between the user terminal 3 and the customer terminal 4 during the online communication, or the like, are displayed.

The user name or the customer name displayed on the user name display window 211 and the customer name display window 213 are displayed by reference of the predetermined storage portion such as an address list storing information regarding the user names and the customer names. For example, the customer name is associated with the IP address of the customer terminal 4 in the predetermined storage portion. Accordingly, the system 2 enables to discriminate the customer by the IP address of the customer terminal 4 acquired at the start of the online communication and to display the customer name.

The icon displayed on the mood display window 215 is based on the result of the analysis of the voice information during the online communication by the analyzing portion 23.

The talk ratio of the user and the customer displayed on the talk ratio display window 216 is also based on the result of the discrimination of the user by tone of voice and a voice quality using the voice information during the online communication by the analyzing portion 23.

The display of the transmission/reception data display window 217 is made possible by recording the names of data transmitted/received to/from each other by the user or the customer at the time of execution of the online communication.

Further, windows indicating the contents of executed functions depending on the function of online communication system may be displayed.

According to the review system 2 for online communication according to the present embodiment, described above, the system enables the review of the online communication sharing web pages, and confirm and discuss precisely the contents of the online communication.

Second Embodiment

Next, a review system for online communication according to a second embodiment of the present invention is described.

The review system according to the present embodiment discriminates accurately whether the web pages shared between the user terminal 3 and the customer terminal 4 described above were shared actually and reflects the result on the screen image of review picture. That is, when a plurality of windows (a multiple window) is deployed on each terminal during the online communication, the browser program displaying the shared web page is non-active, and another application is active, the system 2 determines this as the state of that the web page is not actually shared.

Figure 12:
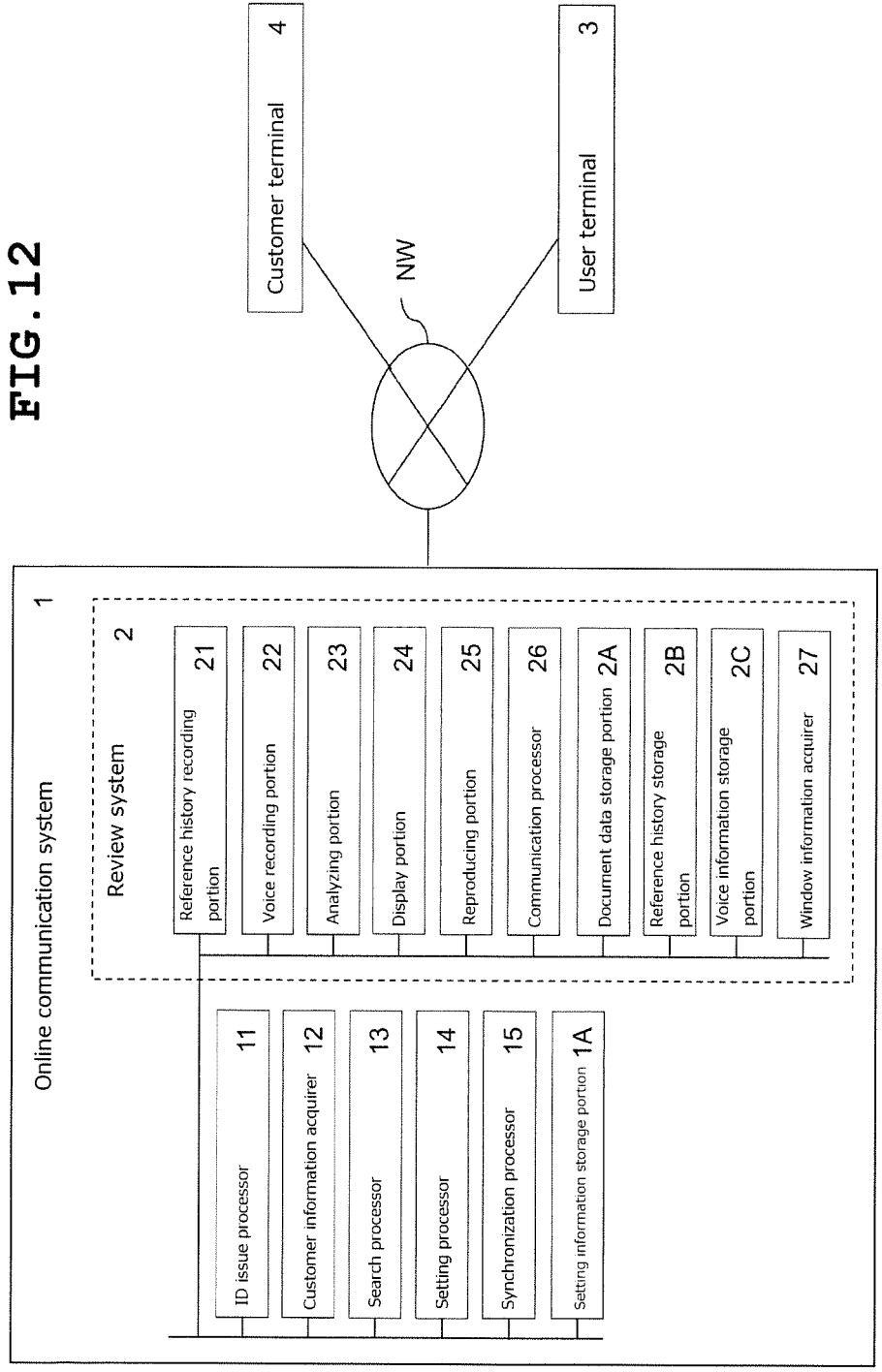
FIG. 12 is a functional block diagram indicating functions provided to an online communication system having a review system according to the second embodiment of the present invention.

FIG. 12 shows a functional block diagram indicating functions provided to a review system 2 and an online communication system according to the embodiment. The functional parts except for a window information acquirer 27, that is a specific functional part of the embodiment, archives the same functions as functional parts provided by the review system 2 according to the first embodiment described above.

The window information acquirer 27 executes a process for acquiring an information of an active window displayed on top when a plurality of windows is deployed on the user terminal 3 or the customer terminal 4 performing the online communication on execution of the online communication.

In this process, for example, the window information acquirer 27 acquires the information regarding the condition of execution of application programs on each terminal, that is, the information capable of being discriminated which application program is active on each terminal.

Based on the information, the review system 2 discriminates whether the web pages deploying on each terminal are actually shared and referred. That is, the web pages shared in this embodiment are displayed by the browser program on each terminal, and the review system 2, based on the information acquired by the window information acquirer 27, can determined that the web page is actually referred and shared when the browser program is active. The review system 2 can also determine that the web page is not actually referred and shared when an application program other than the browser program is active.

The display portion 24 in this embodiment displays on the user terminal 4 the review picture that enables to be discriminated whether the window displaying the shared web pages during the online communication was active or not with reference to the reference history storage portion 2B. That is, the review picture shows identifiably whether the web pages deployed by the browser program on each terminal were actually referred by the user and the customer determined by whether the web pages were active or not. While it is considered that the web page was actually shared when the browser program displaying the web page was active, it is considered that other application program was operated and the web page was not actually shared when the browser program displayed the web page was not active.

As shown in FIG. 13, the reference history storage portion 2B in this embodiment stores an information of the active window during the online communication as well as an order of shared and referred web pages and reference time during the online communication.

Figure 14:
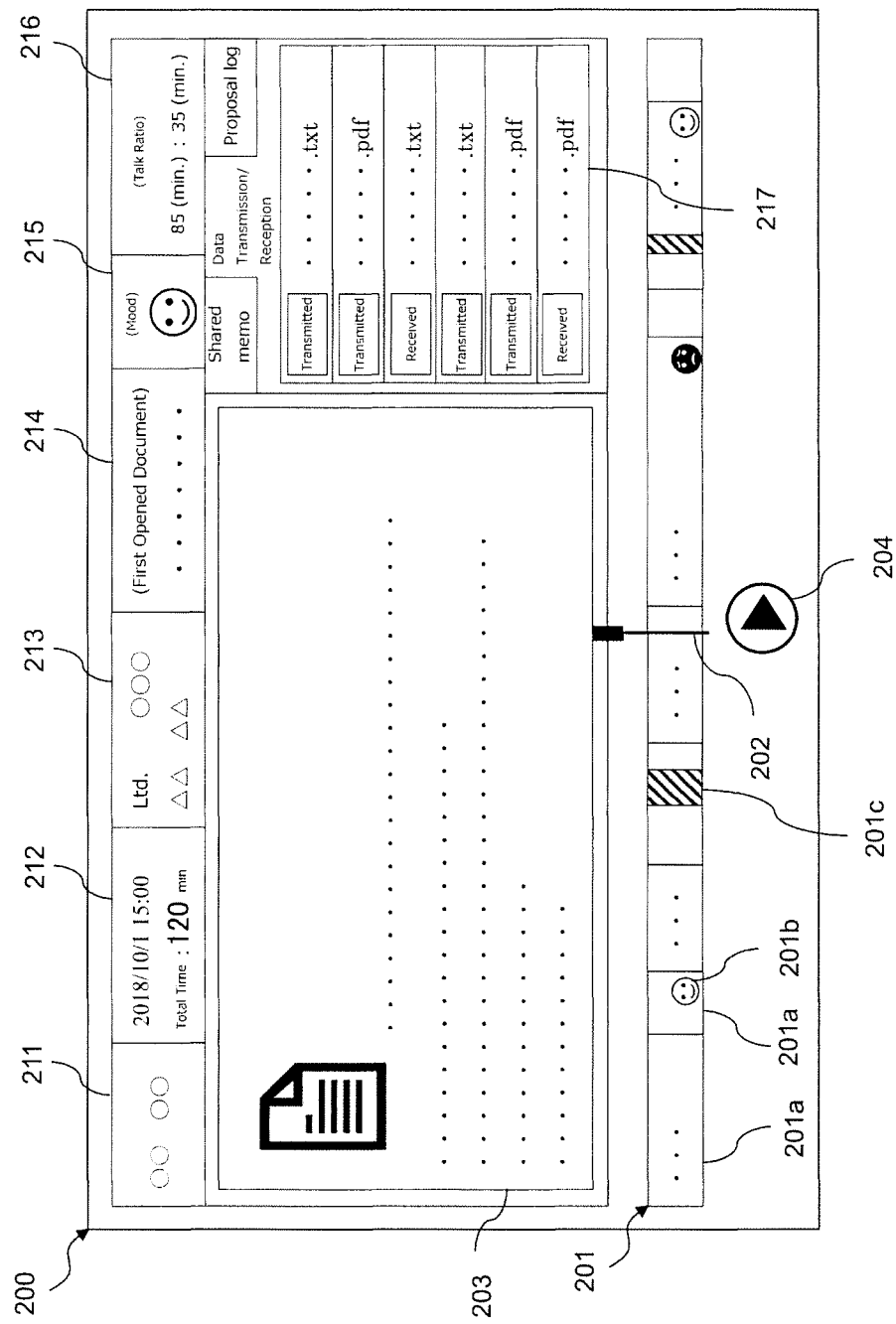
FIG. 14 is an exemplary view of screen image of a review picture on a user terminal performed by the review system.

FIG. 14 shows an exemplary view of screen image of a review picture on a user terminal 3 regarding the review by the review system 2.

While the review picture 200 consists of the same compositions as the review picture described with FIG. 11, the object display window 201 displays identifiably whether the web page indicated on the object 201a was actually referred. That is, the objects 201c which were not actually referred are displayed differently from the others on the object display window 201. In this embodiment, hatching is displayed on the object 201c.

The embodiments of indicating whether they were actually referred are not limited described above. The embodiments are acceptable if the object 201a indicating the web pages actually referred can be distinguished from the object 201c, such as color classification or shading by a predetermined pattern or a fill pattern.

The review system 2 according to the embodiment described above enables of reviewing the contents of the online communication with grasping whether the user and the customer actually referred to the web page.

In the embodiment described above, the online communication system 1 receives the search request of a predetermined communication ID from the user terminal 3 by the search processor 13, and the user refers the search result and transmits the association request with the customer terminal 4 and the start request of the online communication to the online communication system 1.

On the other hand, in the other embodiment, without showing the search result, when the communication ID is received from the user terminal 3 via a predetermined input form, the online communication system may consider the reception of the communication ID as the start request of the communication with the customer terminal 4 associated with the communication ID and the system may associate between the user terminal 3 and the customer terminal 4 and may start the communication.

Further, the system 1 may display the information stored in the setting information storage portion 1A with a list on the user terminal 3. By selecting a predetermined ID among them, the system 1 may consider that it receives the start request of the communication with the customer terminal 4 associated with the communication ID.

Furthermore, in the embodiment, when the user terminal 3 and the customer terminal 4 synchronize and the communication performs with sharing web pages, the web page transition and the mouse operation are synchronized with the other terminal. However, it does not necessarily have to be exactly the same screen images of terminals each other, and the images may be different according to the arbitrary setting. For example, a cursor on one terminal displaying on the other terminal may be colored in different color from a cursor of the other terminal, which enables of being distinguished between the own cursor and the other. In the case of using a web camera by the user, the video of the web camera may be displayed only on the customer terminal 4.

Furthermore, in the embodiment, according to the constitutions of the user terminal 3 and the customer terminal 4, it may be made to display each other's live video by online communication. In this case, the system 1 may record the live video during the online communication and may display the live video with the shared web pages on the review picture.

REFERENCE SIGNS LIST

1 Online communication system
11 ID issue processor
12 Customer information acquirer
13 Search processor
14 Setting processor
15 Synchronization processor
1A Setting information storage portion
2 Review system
21 Reference history recording portion
22 Voice recording portion
23 Analyzing portion
24 display portion
25 reproducing portion
26 Communication processor
27 Window information acquirer
2A Document data storage portion
2B Reference history storage portion
2C Voice information storage portion
3 User terminal
4 Customer terminal
NW Network

What is claimed is:

1. A review system for reviewing an online communication session during which two or more people share a plurality of web pages with one another using a plurality of terminals including a user terminal used by a user and a customer terminal used by a customer, wherein during the online communication session the plurality of web pages were shared in a sequence, one after another, and
for each respective referred web page of the plurality of web pages in the sequence,
the user was a content selector and the customer was a viewer, or the customer was the content selector and the user was the viewer,
when the terminal used by the content selector displayed the respective referred web page, the terminal used by the viewer was synchronized to display the same respective referred web page, the review system comprising:
a reference history storage portion storing
a reference time duration for each of the respective referred web pages referred by the user terminal or the customer terminal during the online communication session, wherein each reference time duration is how long the respective referred web page is shared during the online communication session, and an order of the sequence for the plurality of web pages shared during the online communication session; and a display portion referencing the reference history storage portion, the display portion displaying objects on a display of the user terminal, wherein each object represents a separate respective one of the plurality of web pages and is sized to correspond to a length of the reference time duration of the separate respective one of the plurality of web pages, and the objects are arranged in the order of the sequence.

2. The review system according to claim 1, further comprising a document data storage portion storing the referred web pages during the online communication in association with titles of the referred web pages;

wherein the display portion omits to display a title of any referred web page whose reference time duration is a predetermined length or less.

3. The review system according to claim 1, further comprising:

a voice recording portion recording a voice of the online communication into a voice information storage portion as voice information; and a reproducing portion referencing the voice recording portion and reproducing a voice generated when a referred web page is referred in accordance with a designation of a title of a predetermined web page among the referred web pages displayed on the display portion.

4. The review system according to claim 3, further comprising an analyzing portion referencing the voice information storage portion, analyzing the voice information, and identifying a voice of a speaker contained in the voice information, and wherein the display portion displays an icon indicating that a laugh voice has occurred associated with a title of the referred web page referred when the laugh voice is identified among titles of the referred web pages displayed along time series by the display portion.

5. The review system according to claim 3, further comprising an analyzing portion referring to the voice information storage portion, analyzing the voice information, and identifying each voice of speakers contained in the voice information, and wherein the display portion displays a talk ratio for each of the speakers contained in the voice information recorded in the voice information storage portion, on the user terminal.

6. The review system according to claim 1, further comprising a window information acquirer acquiring an information of an active window displayed on top when a plurality of windows is deployed on the user terminal or customer terminal when the user terminal or customer terminal is performing the online communication, wherein the reference history storage portion further stores an information of the active window on the online communication, and wherein the display portion references the reference history storage portion and displays content capable of discriminating whether the active window displaying the referred web page on the online communication was active.

7. A review method for reviewing an online communication session during which two or more people share a plurality of web pages with one another using a plurality of terminals including a user terminal used by a user and a customer terminal used by a customer, wherein during the online communication session the plurality of web pages were shared in a sequence, one after another, and for each respective referred web page of the plurality of web pages in the sequence, the user was a content selector and the customer was a viewer, or the customer was the content selector and the user was the viewer, when the terminal used by the content selector displayed the respective referred web page, the terminal used by the viewer was synchronized to display the same respective referred web page, the review method comprising:

storing a reference time duration for each of the respective referred web pages referred by the user terminal or customer terminal during the online communication session, wherein each reference time duration is how long the respective referred web page is shared during the online communication session;

storing an order of the sequence for the plurality of web pages shared during the online communication session;

displaying objects on a display of the user terminal, wherein each object represents a separate respective one of the plurality of web pages and is sized to correspond to a length of the reference time duration of the separate respective one of the plurality of web pages, and the objects are arranged in the order of the sequence.

8. A non-transitory computer-readable medium that stores computer-executable instructions for controlling a review system for reviewing an online communication session during which two or more people share a plurality of web pages with one another using a plurality of terminals including a user terminal used by a user and a customer terminal used by a customer, wherein during the online communication session the plurality of web pages were shared in a sequence, one after another, and for each respective referred web page of the plurality of web pages in the sequence, the user was a content selector and the customer was a viewer, or the customer was the content selector and the user was the viewer, when the terminal used by the content selector displayed the respective referred web page, the terminal used by the viewer was synchronized to display the same respective referred web page, the computer-executable instructions, when executed by one or more processors, causing the one or more processors to perform:

storing a reference time duration for each of the respective referred web pages referred by the user terminal or customer terminal during the online communication session, wherein each reference time duration is how long the respective referred web page is shared during the online communication session;

storing an order of the sequence for the plurality of web pages shared during the online communication session; and displaying objects on a display of the user terminal, wherein each object represents a separate respective one of the plurality of web pages and is sized to correspond to a length of the reference time duration of the separate respective one of the plurality of web pages, and the objects are arranged in the order of the sequence.

9. A review system for reviewing an online communication session during which two or more people share a plurality of web pages with one another using a plurality of terminals including a user terminal used by a user and a customer terminal used by a customer, wherein during the online communication session
   the plurality of web pages were shared in a sequence, one after another, and
   for each respective referred web page of the plurality of web pages in the sequence,
      the user was a content selector and the customer was a viewer, or the customer was the content selector and the user was the viewer,
      when the terminal used by the content selector displayed the respective referred web page, the terminal used by the viewer was synchronized to display the same respective referred web page,
the review system comprising:
   a communication processor receiving a reference time duration for each of the respective referred web pages referred during the online communication session, and an order of the sequence for the plurality of web pages shared during the online communication session, for storing; and
   a display portion referencing an information received in the communication processor and displaying objects on a display of the user terminal, wherein
      each object represents a separate respective one of the plurality of web pages and is sized to correspond to a length of the reference time duration of the separate respective one of the plurality of web pages, and
      the objects are arranged in the order of the sequence,
   wherein each reference time duration is how long the respective referred web page is shared during the online communication session.

10. The review system according to claim 1, wherein the display portion further displays for each respective object of one or more of the objects an icon or color classification indicating a mood associated with the respective referred web page corresponding with the respective object.

11. The non-transitory computer-readable medium of claim 8, wherein the displaying step further displays for each respective object of one or more of the objects an icon or color classification indicating a mood associated with the respective referred web page corresponding with the respective object.

12. The review system according to claim 9, wherein the display portion further displays for each respective object of one or more of the objects an icon or color classification indicating a mood associated with the respective referred web page corresponding with the respective object.

13. The review system according to claim 1, wherein the online communication session is a business negotiation.

14. The review system according to claim 1, wherein the plurality of web pages deploy documents for explanation, wherein for each of the plurality of web pages, the display portion displays a respective web page title when the reference time duration of the respective referred web page is a predetermined length or more.

* * * * *